United States Patent
Habib (10) Patent No.: US 12,163,930 B2
(45) Date of Patent: Dec. 10, 2024

(54) WEARABLE SENSOR-BASED SURFACE ANALYSIS

(71) Applicant: Tarkett Sports Canada Inc., Montreal (CA)

(72) Inventor: Eric Habib, Montreal (CA)

(73) Assignee: Tarkett Sports Canada Inc. (CA)

( * ) Notice: Subject to any disclaimer, the term of this patent is extended or adjusted under 35 U.S.C. 154(b) by 258 days.

(21) Appl. No.: 17/955,093

(22) Filed: Sep. 28, 2022

(65) Prior Publication Data

US 2023/0111166 A1 Apr. 13, 2023

Related U.S. Application Data

(60) Provisional application No. 63/251,402, filed on Oct. 1, 2021.

(51) Int. Cl.
| | |
|---|---|
| *G01N 3/40* | (2006.01) |
| *A43B 3/46* | (2022.01) |
| *G01L 5/00* | (2006.01) |
| *G06F 1/16* | (2006.01) |

(52) U.S. Cl.
CPC ................. *G01N 3/40* (2013.01); *A43B 3/46* (2022.01); *G01L 5/0028* (2013.01); *G01L 5/0052* (2013.01); *G06F 1/163* (2013.01); *G01N 2203/0076* (2013.01)

(58) Field of Classification Search
CPC ............. G01N 3/40; G01F 1/163; A43B 3/46; G01L 5/0052; G01L 5/0028
See application file for complete search history.

(56) References Cited

U.S. PATENT DOCUMENTS

2020/0054249 A1* 2/2020 Fukushi ............... A61B 5/6828
2023/0293942 A1* 9/2023 Hunter ................. A63B 53/005
 700/91

* cited by examiner

*Primary Examiner* — Jamel E Williams
(74) *Attorney, Agent, or Firm* — McDonald Hopkins LLC (57) ABSTRACT

Disclosed aspects pertain to surface analysis based on wearable sensor data. Sensor data can be acquired from pressure-sensitive wearable sensors, such as shoe insole sensors, based on interaction with a surface. A location can also be determined for the sensor data with respect to a surface utilizing a positioning system. The sensor data can be utilized to determine surface properties at a particular location. Further, a graphical representation of the surface properties and location can be generated and conveyed for display on a display. Furthermore, movement instructions can be provided to aid in analysis of an entire surface, and recommendations can be made regarding surface maintenance based on collected sensor data.

20 Claims, 6 Drawing Sheets

WEARABLE SENSOR-BASED SURFACE ANALYSIS

CROSS-REFERENCE TO RELATED APPLICATIONS

This application claims the benefit of U.S. Provisional Application No. 63/251,402, filed Oct. 1, 2021, and entitled "WEARABLE SENSOR BASED SURFACE ANALYSIS," the entirety of which is incorporated herein by reference.

BACKGROUND

Traditional testing of playing surface performance and functional state is performed with various machines designed for particular purposes. For instance, tests can be performed for rotational resistance, ball roll, and vertical ball rebound, among other things.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, disclosed aspects relate to surface analysis with data from wearable sensing instruments. A wearable sensor and computing device can be employed to measure the performance and state of a surface, such as a turf field. The sensor and computing device can measure performance, properties, and consistency regularly. In one instance, the sensor can be embedded within shoe insoles and paired with a mobile computing device, such as a smartphone. An individual can walk around on a surface. During this time, the insole sensors and a mobile device collect sensor and location data. A surface property measurement, such as hardness, can be computed based at least on the sensor data. Subsequently, a visual representation of the surface property can be generated. In one instance, a heat map can be displayed on the mobile device showing the state of the surface. Additionally, any maintenance or repair measures that need to be performed, given the state and performance of the surface, can be identified, for example, automatically with a machine learning model. Further, instructions can be determined and provided to one or more individuals to guide the individuals in collecting data as well as implementing repair recommendations.

According to one aspect, disclosed embodiments can include a computer system that comprises a processor coupled to a memory that includes instructions associated with surface property assessment that, when executed by the processor, cause the processor to determine a location on a surface associated with data received from one or more pressure-sensitive wearable devices measuring pressure exerted by the surface, compute a surface property measurement based on the data and the location, generate a visual representation of the surface property measurement, and convey the visual representation for display on a display device. The instructions can further cause the processor to generate a visual representation of progress receiving data from locations on a surface relative to an entire surface, in which areas are differentiated based on whether the data has been received for a location. In one instance, the display device is coupled to a mobile computing device that is paired with the one or more pressure-sensitive wearable devices. The instructions can further cause the processor to aggregate data from pressure-sensitive wearable devices, or wearable sensors, of multiple people. The surface property measurement can correspond to one of surface hardness, linear traction, rotational traction, infill stability, vertical deformation, or shock absorption, among other things. In various embodiments, the pressure-sensitive wearable device can be at least one of a shoe insole, a shoe cleat, or a sock. Furthermore, the instructions can cause the processor to convey the visual representation to an augmented reality device that overlays the visual representation on a surface in view.

In accordance with another aspect, disclosed embodiments can include a method comprising executing, on a processor, instructions associated with surface analysis that cause the processor to perform operations. The operations can comprise determining a location on a surface associated with data received from one or more wearable pressure sensors that measure pressure exerted by the surface, computing a surface property metric based on the data and the location, generating a graphic representation of the surface property metric, and conveying the graphic representation to a display device for presentation. The operations can further comprise determining a location on the surface associated with the data and identifying the location as visited on the graphic representation. Further, the operations can comprise generating a heat map with surface property metrics as the graphic representation, wherein the heat map is overlaid on an image representative of the surface. The operations can also include giving instructions for performing movements in order to record a surface property metric. Further, the operations can comprise providing real-time feedback on movements being performed for measuring surface performance and properties. Furthermore, the operations can comprise conveying the graphic representation to an augmented reality device for display.

According to yet another aspect, disclosed embodiments can include a computer-implemented method. The method includes pairing a computing device to one or more wearable pressure sensors, receiving data from the sensors, determining a location on a surface associated with the data from the sensors, computing a surface property from the data, generating a graphical representation of the surface property at the location on the surface, and conveying the graphical representation to a display device for rendering. The method can further comprise determining a maintenance recommendation based on the surface property. Further, the method can comprise providing instructions for performing movements in order to record the surface entirely.

To accomplish the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Surfaces, like artificial turf fields, are tested with a variety of machines designed for that purpose, including Advanced Artificial Athlete, Clegg hammer, rotation resistance device, ball roll ramp, and vertical ball rebound device. These tests use heavy, unwieldy instruments and are difficult and expensive to perform. As a result, these tests are seldom executed.

Furthermore, certain properties of a surface are inadequately characterized by existing test equipment. Some of these properties are reported subjectively by those familiar with the surfaces by simply walking or otherwise interacting with the surface. In particular, infill stability, subjective surface hardness, and athlete slip and traction are experiences often cited as being different (e.g., better or worse) for surfaces where objectively measured metrics do not match those expressed experiences.

Details disclosed herein generally pertain to a system that determines the performance and state of a surface that is expeditious and easy to use. It can be employed regularly by a surface manager or maintainer to assess the surface and homogeneity of the surface, ideally matching subjectively reported values. As noted, this can be accomplished with a wearable sensor and associated computing device, such as insole sensors and a paired mobile device. The sensors can collect data and provide it to the computing device, which can render a heat map or other representation of the state and performance of the surface.

In accordance with one embodiment, a wearable insole sensor is equipped with pressure or force sensors and an inertial measurement unit (IMU). The sensor can measure the force applied to the underside of the foot surface (and vice versa) as well as acceleration, rotation, and orientation of the sensor in question. Collected data can be further used to calculate user interaction parameters. The focus of the description herein is on insole sensors. However, substantially any wearable sensor can be used to assess a surface's properties, including, but not limited to, cleat and sock sensors. Further, shoe sensors other than those associated with the insole can also be employed.

An insole sensor can be paired to an external device such as a mobile phone. Data can be stored on the insole sensor, sent to the external device, or both. Data from the sensor can be combined with onboard sensor data from the external device (e.g., nine axes inertial measurement unit, GPS antenna, barometer, ambient light sensor). These additional data sources can be included to measure the performance and properties of a surface, such as elastic and loss moduli of the surface, surface deformation, slippage/friction/traction, Gmax (maximum vertical acceleration upon impact), HIC (Head Impact Criterion for head injury), and any other field metrics.

In addition to the insole sensors and external device sensors, for more precise measurements, one or more location devices (e.g., beacons) can be placed around a measurement area to aid in positioning the insole sensors or first external device more precisely by using the onboard radios of the first external device (e.g., cellular, Wi-Fi, Bluetooth, Global Positioning System (GPS), Local Positioning System (LPS), UltraWideBand) as a method of positioning, using signal strength or other signal data. Alternatively, beacons could generate audible tones through a synchronized clock that could be heard by the first external device's microphone and used to calculate position relative to the beacons from the delay.

The collected data can be processed and viewed on an external instrument to which the data can be transferred. This instrument can be the client device (in the user's hand) or on a server in the cloud. The processed data is then returned to the user's device for interaction.

Collected data can be processed directly on a user's mobile device or uploaded to a network server (e.g., cloud) for processing. Processing can involve using a database of previously collected data to compare the properties of the existing surface to a reference surface or against initial values of the surface being assessed to give a result to the user as to the change in performance versus the initial value. Otherwise, as more data is collected over time, machine learning algorithms can be used to give better and more precise recommendations on how to improve the state of the field or how to maintain the field in its current state best. A user can be provided a means within a corresponding application to enter feedback or notes for the measurement and the data, further aiding in continuous improvement.

Data processing can comprise measuring maximum acceleration forces exerted on the sensors when performing a repetitive movement such as walking or jumping, which relates to the hardness of the field. Other metrics related to gait analysis or step timing or symmetry, such as step time, foot-surface contact time, toe push-off force, and toe push-off time, can be calculated from the data. Further, more complex metrics can be used to gain additional information, such as consistency of weight distribution across the foot, heel contact force and time, pressure gradient across one or many horizontal axes of the sensor, and metrics relating the pressure readings with acceleration or rotation changes such as horizontal acceleration related to vertical pressure.

In operation, a user can put a pair of insole sensors in the user's shoes or use other wearable ground pressure sensors and then walk a surface. A software application on the user's device can display progress to completion of coverage on the desired surface area. It can also issue instructions to the user on maneuvers to perform to collect optimal data for the type of information requested by the user. For example, in order to assess the hardness and hardness consistency of an artificial turf field, the user would select this option on an application on a mobile phone that might then instruct the user on the procedure to follow, for instance, placing insoles in shoes, performing a calibration procedure, then display a map of an artificial turf field to be assessed, where a map is displayed on the application showing the measurements so far and the progress to be made so that the user knows where to go to complete the assessment, and can revisit certain areas if they think the data is at fault.

A variety of tests can be devised to cover the field performance metrics listed above, as pertaining to the direct experience of the player on the field or pertaining to player safety or comfort, or the properties of the field itself, where required actions can be further inferred, such as adding additional infill, adding additional glue in the case of excess slip, or any other topical or in-depth treatment as recommended by the turf manufacturer. Other methods of use include the user running and suddenly veering in a different direction, which would measure "grip" or linear and rotational traction, and rotational resistance of the field, and any potential slippage at the surface. This could lead to recommendations for surface treatments to reduce friction.

The application could then display some helpful information to the user, such as a heat map of field wear and consistency, and recommendations for certain actions such as performing routine maintenance like infill loosening or fiber brushing on the field, or even more involved processes such as infill redistribution or addition of infill to the field, or even up to recommending field replacement.

Aspects of this disclosure can also be employed in conjunction with other surface analysis systems. For example, the sensor could be used to a similar effect as current standard ball bounce methods, coupled with a visual camera sensor. The sensor, more specifically its IMU measurement information, could also be used in conjunction with camera ball tracking data to perform tests that would not be possible or as accurate without them. One such test would be an assessment of the quality or state of a ball, where the user would kick a ball, and the resulting ball movement and bounces would be measured. Knowing the movement of the foot and ball, the resulting ball bounce could indicate measures necessary on the field. Alternatively, the insole pressure sensors might be used as mechano-acoustic sensors on the surface to detect proximal ball bounces or other impacts to use timing to infer further information.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
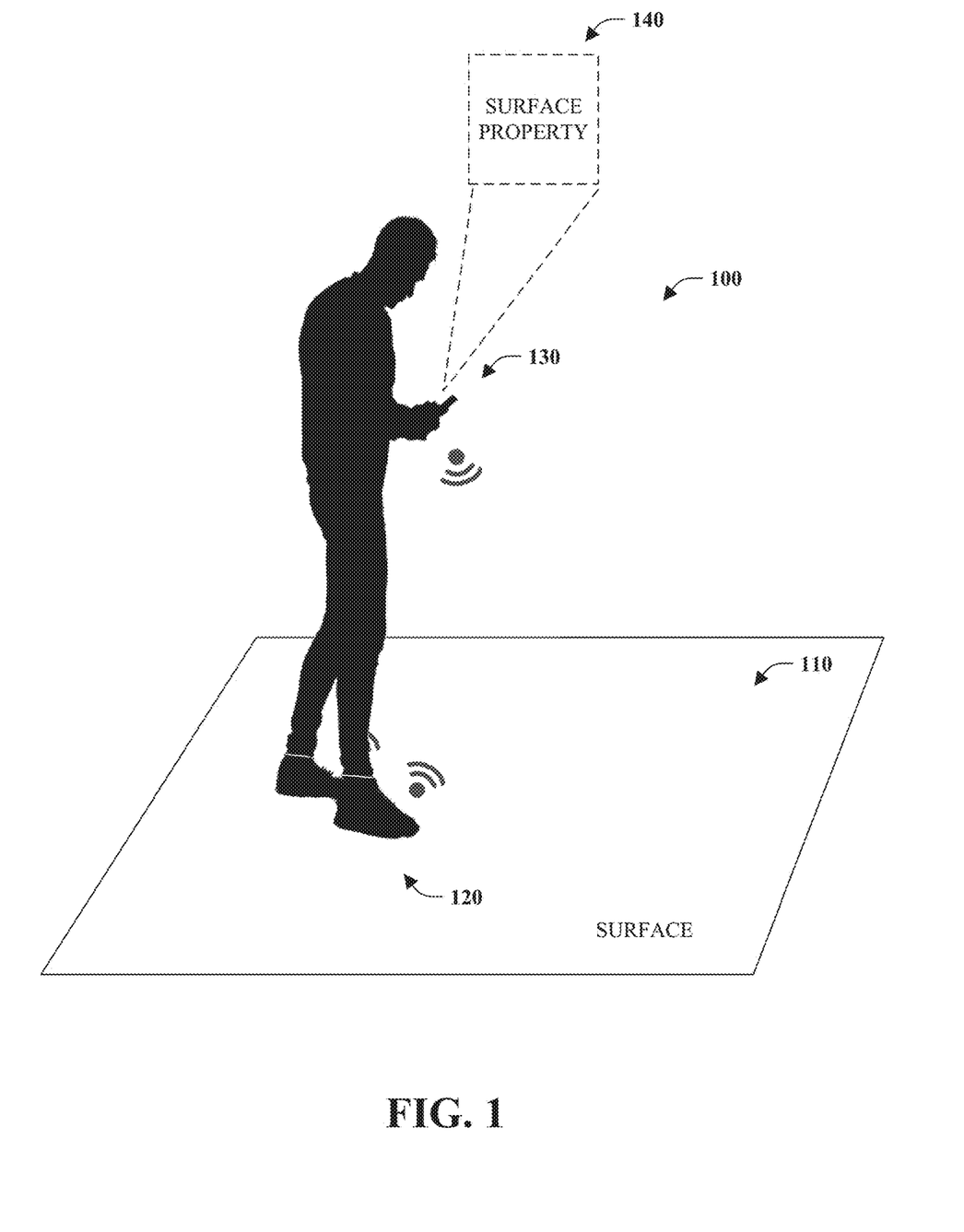
FIG. 1 illustrates a high-level overview of an example implementation of electronic assessment of playing surface properties.

Referring initially to FIG. 1, a high-level overview of an example analysis system 100 is depicted. The system 100 includes insole sensors 120 and a mobile computing device 130 that operate with respect to surface 110. Although not limited thereto, the surface analysis system 100 is suited to determine mechanical, performance, safety, or other physical properties of athletic playing surfaces, for example, provided by an artificial turf field or hybrid field.

The surface analysis system 100 operates over the playing surface 110 and is configured to determine the properties or characteristics of the playing surface 110. The playing surface 110 can be grass, hybrid turf, or an artificial turf field associated with soccer, baseball, or field hockey. Of course, the playing surface 110 can correspond to an alternate surface type, such as hardwood for basketball and ice for hockey.

As shown, an individual can wear shoes with insertable insole sensors 120. The wearable insole sensors 120 can be equipped with pressure or force sensors and an inertial measurement unit (IMU). The sensors can measure the force applied to the underside of the foot surface (and vice versa) as well as acceleration, rotation, and orientation of the sensor. Further, the sensors can measure lateral or shearing force. The sensors can be integrated within the insoles or other portions of a shoe. Substantially any wearable sensor can be used to assess a surface's properties. For clarity and understanding, the description focuses on the wearable insole sensors 120. However, other sensors can be employed in place of or in conjunction with wearable insole sensors, including cleat and sock sensors.

The insole sensors 120 can be paired to an external computing device 130, such as a mobile phone or field-side computer. Additionally, an external data capture and upload device can also interact with the insole sensors 120. Data can be stored on the insole sensors, sent to the external device, or both. Data from the sensors can be combined with onboard sensor data from the external device (e.g., nine-axis inertial measurement unit, GPS antenna, barometer, ambient light sensor). These additional data sources can be included to measure the performance and properties of a surface, such as elastic and loss moduli of the surface, surface deformation, slippage/friction/traction, Gmax (maximum vertical acceleration upon impact), HIC (Head Impact Criterion for head injury), and any other relevant field metrics.

Data from the insole sensors 120 and the computing device 130 can be processed to produce measurements of one or more properties, such as surface hardness or traction, among other things. Data processing can comprise measuring maximum acceleration forces exerted on the sensors when performing a repetitive movement such as walking or jumping, which relates to the hardness of the field. Other metrics such as step time, or foot-surface contact time, toe push-off force, and toe push-off time can be calculated from the data. Further, more complex metrics can be used to gain additional information, such as consistency of weight distribution across the foot, heel contact force and time, and horizontal acceleration related to vertical pressure. The data processing can be performed by the computing device 130 or other computing devices, including a server and network-accessible service.

The output of the assessment system can be provided by way of a user interface of the computing device 130. A surface property 140 can be displayed on the computing device 130 through the user interface. Further, progress as far as walking a surface, such as a field, can be displayed. Further yet, various graphics can be generated for presentation or a report assessing the state of the field. For example, a heat map representing surface hardness can be generated and displayed over an assessed field.

FIG. 1 depicts an embodiment involving solely one person. However, disclosed aspects are not limited thereto. In fact, multiple individuals can be involved in executing and collecting field data for the surface assessment system 100 to facilitate expeditious assessment. Further, differences in weights of individuals can yield additional valuable information. Alternatively, weight differences can be normalized or averaged for all individuals. Multiple computing devices or sensors of individuals can be connected by one of many network topologies. In one instance, a mesh network of devices can be employed that allows devices to connect directly to other devices or nodes to cooperate with one another. Alternatively, a central hierarchical network can be employed in which the devices connect to a central device that aggregates data from multiple devices.

Figure 2:
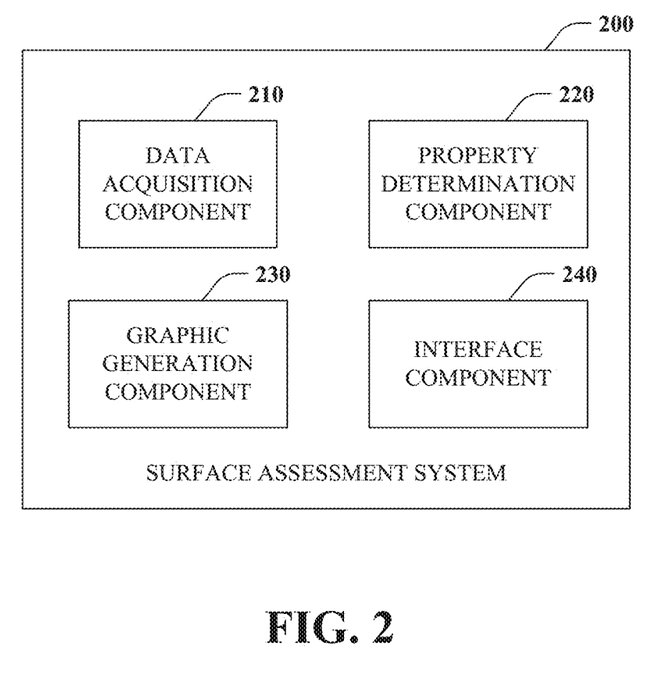
FIG. 2 is a sample surface assessment system.

Turning to FIG. 2, a sample surface assessment system 200 is illustrated. The surface assessment system 200 comprises data acquisition component 210, property determination component 220, graphic generation component 230, and interface component 240. In accordance with one embodiment, the components of the assessment system 200 can be computer-executable components that comprise instructions. When executed by a processor, the instructions can perform the functionality of each component. As such, a computing device is configured to be a special-purpose device or computer appliance that implements the surface assessment system 200. In one instance, the surface assessment system 200 can be implemented by a user's mobile computing device, for example, by way of a mobile application or service. In another instance, the surface assessment system 200 can be configured and provided as a network-accessible service. Other configurations and implementations are also possible and contemplated.

The data acquisition component 210 is configured to receive, retrieve, or otherwise obtain or acquire data relevant to surface assessment. For example, the data acquisition component 210 can enable wireless pairing and data acquisition from wearable sensors, such as insole sensors. The data can be provided in substantially real-time or batched and sent periodically, automatically, or in response to a request from the data acquisition component 210. Further, the data acquisition component 210 can receive, retrieve, or otherwise obtain or acquire data from onboard measurement instruments of a mobile computing device associated with wearable sensors, such as global positioning satellite location data and inertial movement data.

The property determination component 220 can determine or infer various surface properties. The determination can be made based on data from a wearable sensor, computing device, or both. In accordance with one example, the insole sensors can measure the force applied to the underside of the foot and surface as an individual travels around a surface. The determination component 220 can compute one or more property measurements, such as surface hardness, based on the force recorded by the insole sensors. Other surface metrics that can be determined or inferred include liner surface traction, rotational resistance, rotational traction, infill stability, vertical deformation, and shock absorption.

The graphic generation component 230 is operable to generate graphics or graphical elements visually representing one or more properties returned by the property determination component 220. For example, a heat map can be generated and overlaid on a field representation. Magnitudes of a property such as surface hardness are represented by variation in color in hue or intensity. Further, the graphic generation component 230 can interact with augmented reality glasses or a smartphone to overlay a visualization on an image of the real world.

The interface component 240 is operable to provide a graphical user interface for a user to facilitate receipt and dissemination of data or information. In one instance, the interface component 240 can compile graphic elements provided by the graphic generation component 230 into a single representation and convey the representation for display on a display device. Furthermore, the interface component 240 can enable interaction and real-time or near real-time updates.

The surface assessment system 200 can optionally include a plurality of other components not illustrated. By way of example, and not limitation, a comparison component can be included and operable to compare current properties to historical properties of the same surface or current or historical properties of other surfaces.

Figure 3:
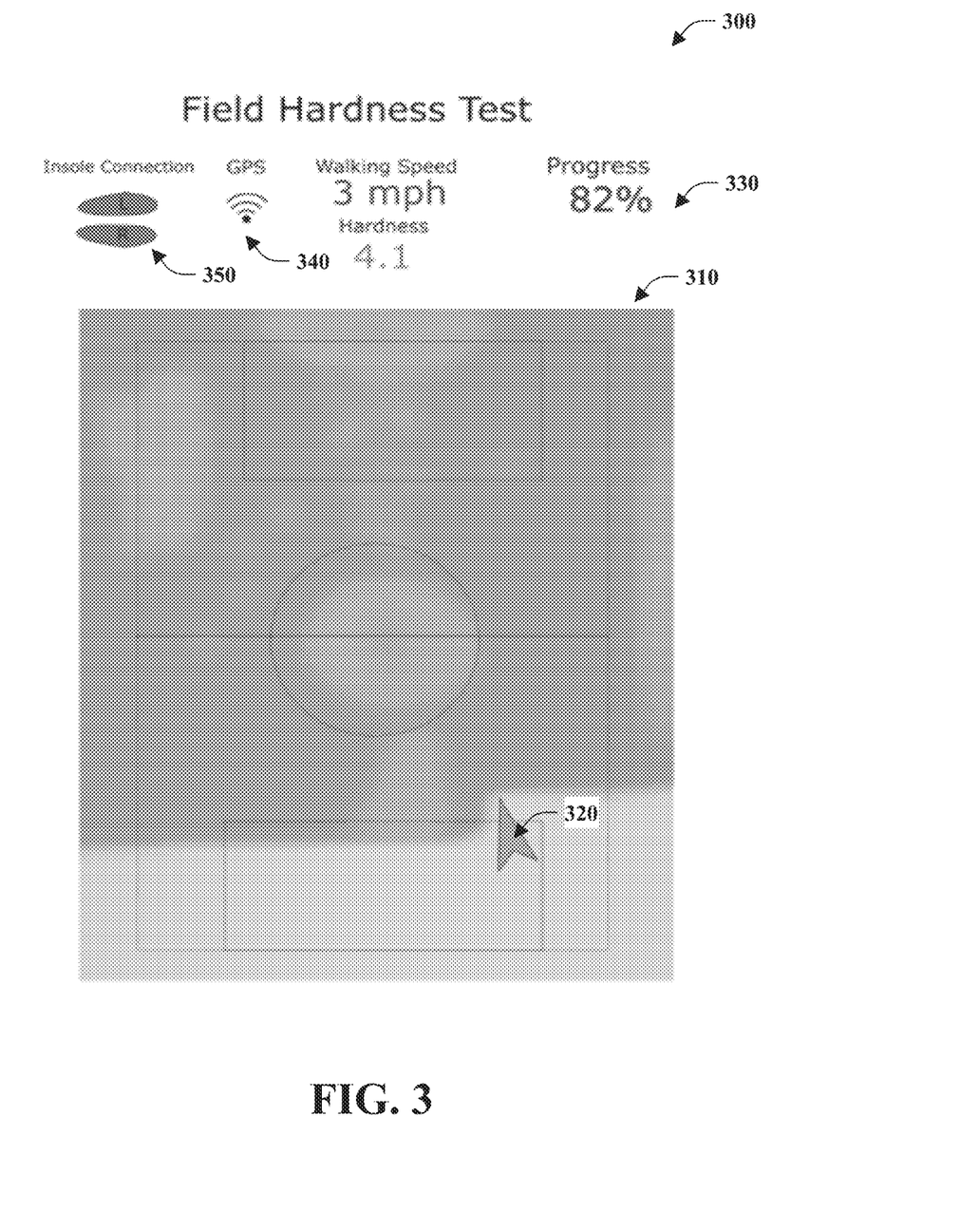
FIG. 3 is an example screenshot of a graphical user interface for a field hardness test.

FIG. 3 is an example screenshot 300 of a user interface comprising multiple graphic elements generated by the interface component 240 in conjunction with the graphic generation component 230. As shown, the screenshot 300 is associated with a field hardness test and includes a heat map 310 overlaid on the boundaries of a soccer field. Further, the heat map 310 shows the progress made with respect to acquisition of sensor data. The dark areas indicate a measured portion of the field, and the light areas denote an unmeasured portion or potentially erroneous data, requiring re-measurement. An arrowhead 320 is also displayed, showing the user's current location and can be informative as to where to walk next to achieve complete field coverage. The screenshot 300 also includes numeric information 330 regarding progress, namely "82%" progress, "3" miles per hour walking pace, and a hardness measure of "4.1." There are also graphical indications of a global positioning satellite connection 340 and active insole sensors 350 in left and right shoes.

The aforementioned systems, architectures, platforms, environments, and the like have been described with respect to interaction between several components. It should be appreciated that such systems and components can include those components or sub-components specified therein, some of the specified components or sub-components, or additional components. Sub-components could also be implemented as components communicatively coupled to other components rather than included within parent components. Further yet, one or more components or sub-components may be combined into a single component to provide aggregate functionality. Communication between systems, components, or sub-components can be accomplished following either a push or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed, thereby making portions of the systems and methods more adaptive as well as efficient and intelligent. By way of example, and not limitation, the surface assessment system 200 can employ such mechanisms to generate recommendations regarding field maintenance, repair, or replacement based on captured properties of a surface. For instance, a recommendation can be made to loosen infill, brush a field, or add or remove infill. Further, such mechanisms can be employed to infer and instruct a user on a path covering the entire field or portion thereof.

Figure 4:
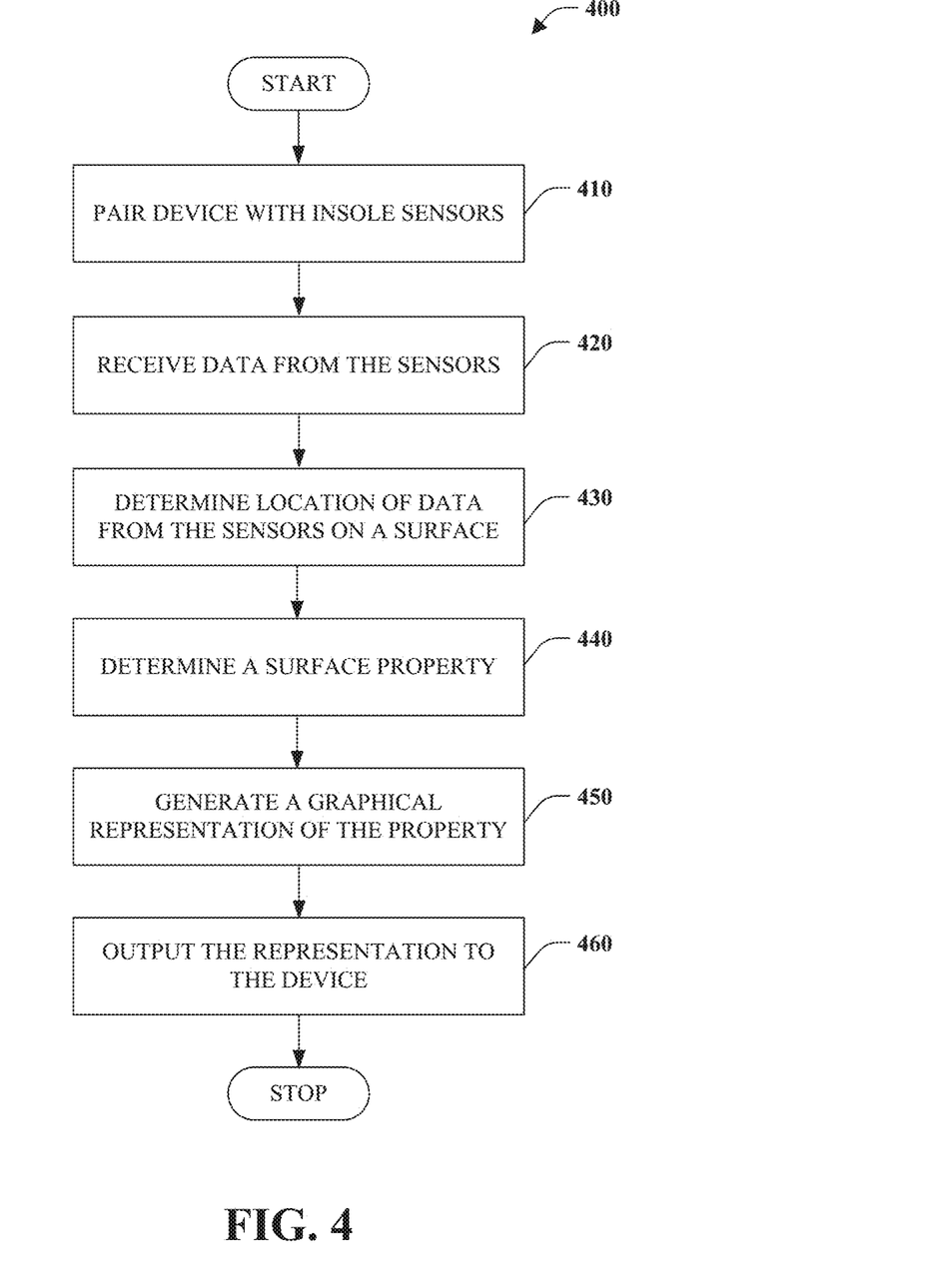
FIG. 4 is a flow chart diagram of a method of surface assessment.
Figure 5:
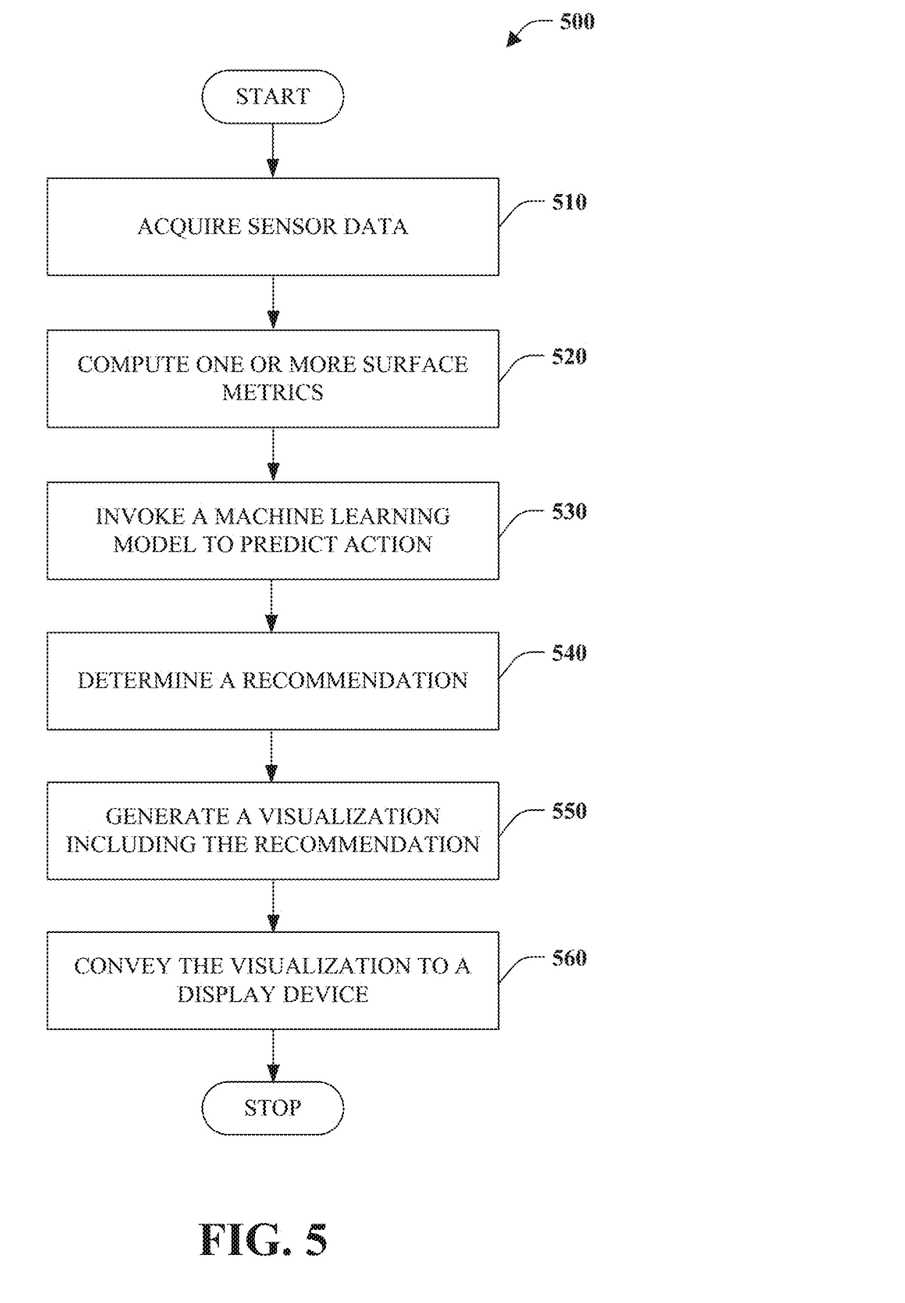
FIG. 5 is a flow chart diagram of a method of provisioning surface maintenance recommendations.

In view of the example systems described above, methods that may be implemented according to the disclosed subject matter will be better appreciated with reference to the flow chart diagrams of FIGS. 4 and 5. While for purposes of simplicity of explanation, the methods are shown and described as a series of blocks, it is to be understood and appreciated that the disclosed subject matter is not limited by the order of the blocks, as some blocks may occur in different orders or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 4 illustrates a surface assessment method 400. The surface assessment method 400 can be performed by the surface assessment system 200. At numeral 410, one or more insole sensors are paired or otherwise connected with a computing device. For example, the sensors can be paired with a user's mobile phone to enable communication. In one instance, a user may need to manually pair the sensors to the computing device. Alternatively, the sensors can be configured to automatically connect or activate when within a predetermined distance of each other.

At numeral 420, data from the sensors is received by the computing device. For example, force data associated with each sensor as an o moves around a field can be received. In one instance, the data can be received from a myriad of sensors of multiple individuals traversing the field.

At numeral 430, the location of the data from the sensors can be determined. In one instance, global satellite positioning (GPS) data from a paired computing device can be linked to the sensor data. Additionally, or alternatively, beacons can be positioned at particular locations on a field and utilized to determine position, for example, based on signal strength associated with beacons, using a local positioning system (LPS) or other such systems.

At numeral 440, a surface property is determined based on data from the insole sensors and, optionally, a paired computing device. For instance, a measure of surface hardness can be computed at particular locations on a field based on data received from the insole sensors and a paired computing device.

At numeral 450, a graphical representation of the determined surface property is generated. For example, a heat map of surface hardness measures across a field can be generated. At numeral 460, the graphical representation is output for display on a display device, such as the paired computing device.

FIG. 5 depicts a flow chart diagram of a method 500 of providing surface maintenance recommendations. The method can be implemented and performed by the surface assessment system 200 and various components thereof.

At reference numeral 510, the method 500 receives, retrieves, or otherwise obtains or acquires sensor data. The sensor data can correspond to data from one or more pressure-sensitive wearable devices, including, but not limited to, shoe insole, cleat, or sock sensors. Additional sensor data can also be acquired from sensors of a paired computing device such as a smartphone. This data can include location, acceleration, and temperature data, among other things. The data can be acquired directly from the sensors and device or indirectly through a central storage system, such as a database. Regardless of the source, the data concerns conditions or factors surrounding a surface such as a field.

At numeral 520, the method 500 computes one or more metrics from the sensor data. In one instance, surface hardness can be computed from pressure data from a wearable device. Further, linear or rotational traction can be computed. Other metrics can also be computed, including, but not limited to, infill stability, vertical deformation, and shock absorption.

At reference 530, the method invokes execution of a machine learning model to determine a course of action based on the one or more computed metrics. The machine learning model can correspond to a supervised learning model trained with historical data including conditions captured by one or more metrics and courses of action taken to respond to those conditions. The machine learning model can receive the one or more metrics, infer or predict an action, and output the action and, optionally, a confidence level associated with the action.

At numeral 540, the method 500 generates a recommendation based on the action provided by the machine learning model. The recommendation and action can correspond to surface maintenance suggestions. For example, traction issues can involve the addition of glue to particular locations. As another example, lower than a desired maximum acceleration force when performing a repetitive movement, such as walking or jumping, can lead to a recommendation associated with increasing the hardness of a surface. In addition to surface adjustments or modifications, the method 500 can also generate a recommendation to replace a surface. For example, if metrics continue to decrease and become less responsive to maintenance, surface replacement can be recommended.

At reference numeral 550, the method 500 conveys the generated recommendation to a display for presentation. The recommendation can be presented alone or in conjunction with field metric data and graphics. In one instance, the recommendation can be displayed in augmented reality by smart glasses, phones, or the like. For example, the recommendation can be presented and overlaid on an image including the surface. Further, recommendations can be targeted and specific. Accordingly, the recommendations can identify particular portions of a surface that need maintenance. As an individual walks a field, a graphic may be displayed at particular field locations as viewed in augmented reality. For example, a graphic can be displayed at a location on the field where additional infill is recommended.

The subject disclosure pertains to the technical problem of assessing playing surface properties. The technical solution comprises acquiring data from one or more wearable sensors and onboard sensors from a paired computing device. Properties such as surface hardness can subsequently be determined based on available data. Graphics can be generated that represent progress in data collection as well as surface property values. Further, maintenance recommendations can be inferred by a machine learning model based on one or more input metrics. Further yet, visualizations can be rendered in augmented reality by way of augmented reality glasses or a smartphone.

Aspects of this disclosure focus on shoe insole sensors, as an example a pressure-sensitive wearable device. However, the disclosure is not limited to insole sensors. Other devices are also possible and contemplated. For example, shoe cleat sensors and shoe straps sensors can also be employed as pressure-sensitive wearable devices. Sensors can be woven into fabric of a shoe itself or a sock, which are also examples of pressure-sensitive wearable devices. The type of sensor and positioning can also provide additional properties and metrics that can be employed in assessing a surface, among other things. For instance, socks or shoe fabric can sense lateral forces and aid in safety consideration associated with turf toe or improper shoe fit. Of course, other wearable sensor devices related to the shoe or other apparel are also pressure-sensitive wearable devices.

As used herein, the terms "component" and "system," as well as various forms thereof (e.g., components, systems, sub-systems), are intended to refer to a computer-related entity, either hardware, a combination of hardware and software, software, or software in execution. For example, a component may be but is not limited to a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

Figure 6:
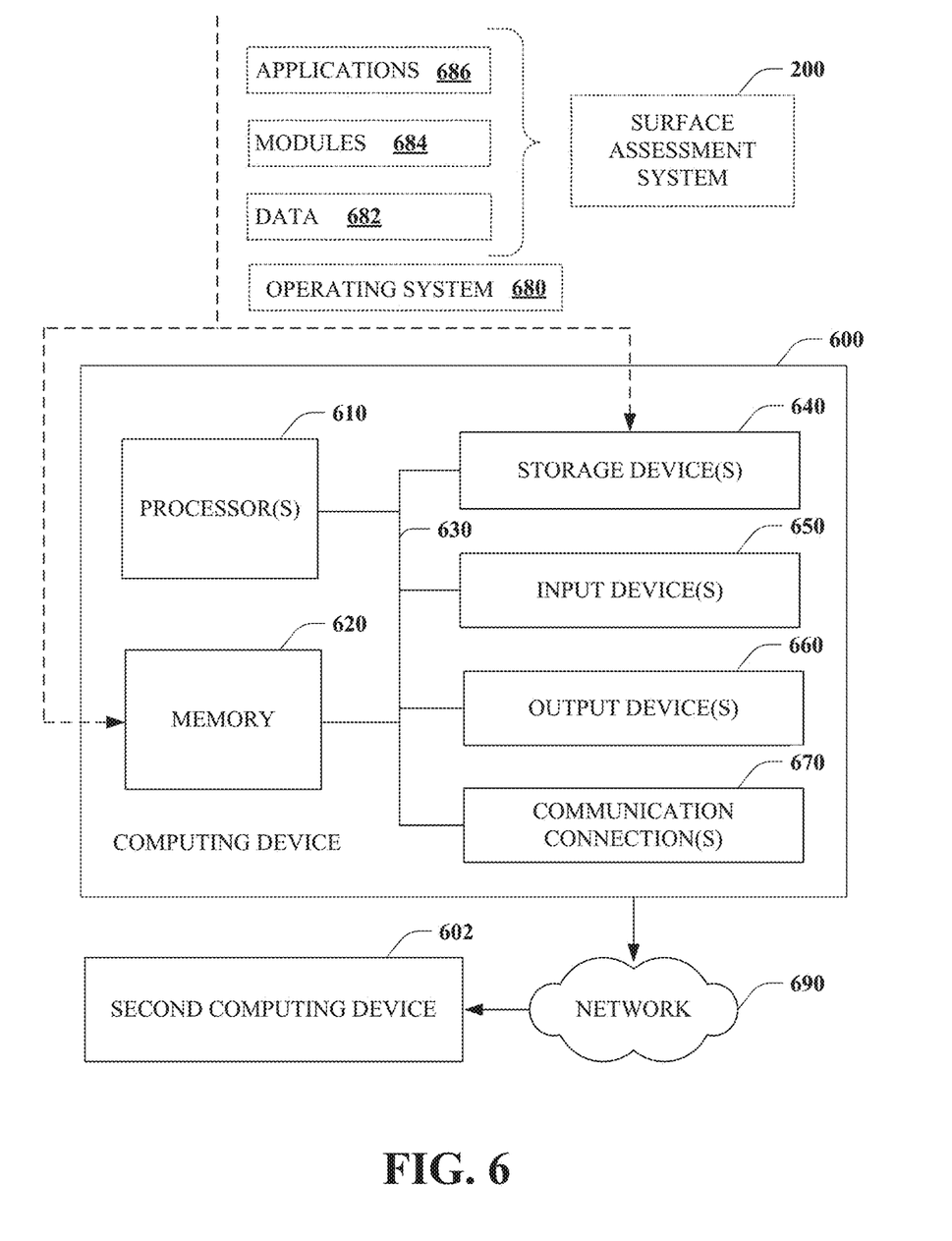
FIG. 6 is a block diagram illustrating a suitable operating environment for aspects of the subject disclosure.

To provide a context for the disclosed subject matter, FIG. 6 and the following discussion are intended to provide a brief, general description of a suitable environment in which various aspects of the disclosed subject matter can be implemented. However, the suitable environment is solely an example and is not intended to suggest any limitation regarding scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

FIG. 6 illustrates an example computing device 600 (e.g., desktop, laptop, tablet, watch, server, hand-held, programmable consumer or industrial electronics, set-top box, game system, compute node . . . ). The computing device 600 includes one or more processor(s) 610, memory 620, system bus 630, storage device(s) 640, input device(s) 650, output device(s) 660, and communications connection(s) 670. The system bus 630 communicatively couples at least the above system constituents. However, the computing device 600, in its simplest form, can include one or more processors 610 coupled to memory 620, wherein the one or more processors 610 execute various computer-executable actions, instructions, and or components stored in the memory 620.

The processor(s) 610 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 610 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 610 can be a graphics processor unit (GPU) that performs calculations concerning digital image processing and computer graphics.

The computing device 600 can include or otherwise interact with a variety of computer-readable media to facilitate control of the computing device to implement one or more aspects of the disclosed subject matter. The computer-readable media can be any available media accessible to the computing device 600 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM), magnetic storage devices (e.g., hard disk, floppy disk, cassettes, tape), optical disks (e.g., compact disk (CD), digital versatile disk (DVD) . . . ), and solid-state devices (e.g., solid-state drive (SSD), flash memory drive (e.g., card, stick, key drive)), or any other like mediums that store, as opposed to transmit or communicate, the desired information accessible by the computing device 600. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 620 and storage device(s) 640 are examples of computer-readable storage media. Depending on the configuration and type of computing device, the memory 620 may be volatile (e.g., random access memory (RAM)), non-volatile (e.g., read only memory (ROM), flash memory ... ), or some combination of the two. By way of example, the basic input/output system (BIOS), including basic routines to transfer information between elements within the computing device 600, such as during start-up, can be stored in non-volatile memory, while volatile memory can act as external cache memory to facilitate processing by the processor(s) 610, among other things.

The storage device(s) 640 include removable/non-removable, volatile/non-volatile storage media for storage of vast amounts of data relative to the memory 620. For example, storage device(s) 640 include, but are not limited to, one or more devices such as a magnetic or optical disk drive, floppy disk drive, flash memory, solid-state drive, or memory stick.

Memory 620 and storage device(s) 640 can include, or have stored therein, operating system 680, one or more applications 686, one or more program modules 684, and data 682. The operating system 680 controls and allocates resources of the computing device 600. Applications 686 include one or both of system and application software and can exploit management of resources by the operating system 680 through program modules 684 and data 682 stored in the memory 620 and/or storage device(s) 640 to perform one or more actions. Accordingly, applications 686 can turn a general-purpose computer 600 into a specialized machine in accordance with the logic provided thereby.

All, or portions, of the disclosed subject matter can be implemented using standard programming and/or engineering techniques to produce software, firmware, hardware, or any combination thereof to control the computing device 600 to realize the disclosed functionality. By way of example and not limitation, all, or portions, of the surface assessment system 200 can be, or form part of, the application 686, and include one or more modules 684 and data 682 stored in memory and/or storage device(s) 640 whose functionality can be realized when executed by one or more processor(s) 610.

In accordance with one particular embodiment, the processor(s) 610 can correspond to a system on a chip (SOC) or like architecture including, or in other words integrating, both hardware and software on a single integrated circuit substrate. Here, the processor(s) 610 can include one or more processors as well as memory at least similar to the processor(s) 610 and memory 620, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the surface assessment system 200 or functionality associated therewith can be embedded within hardware in a SOC architecture.

The input device(s) 650 and output device(s) 660 can be communicatively coupled to the computing device 600. By way of example, the input device(s) 650 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 660, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 650 and output device(s) 660 can be connected to the computing device 600 by way of wired connection (e.g., bus), wireless connection (e.g., Wi-Fi, Bluetooth), or a combination thereof.

The computing device 600 can also include communication connection(s) 670 to enable communication with at least a second computing device 602 utilizing a network 690. The communication connection(s) 670 can include wired or wireless communication mechanisms to support network communication. The network 690 can correspond to a local area network (LAN) or a wide area network (WAN) such as the Internet. The second computing device 602 can be another processor-based device with which the computing device 600 can interact. For example, the second computing device 602 can correspond to a server that provides a network-accessible service or application employed by the computing device 600.

What has been described above includes examples of aspects of the claimed subject matter. It is, of course, not possible to describe every conceivable combination of components or methodologies for purposes of describing the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer system, comprising:
    a processor coupled to a memory that includes instructions to perform surface property assessment that, when executed by the processor, cause the processor to:
        determine a location on a surface associated with data received from one or more pressure-sensitive wearable devices measuring pressure exerted by the surface;
        compute a surface property measurement based on the data and the location;
        generate a visual representation of the surface property measurement; and
        convey the visual representation for display on a display device.

2. The system of claim 1, wherein the instructions further cause the processor to generate a visual representation of progress receiving data from locations on a surface relative to an entire surface, wherein areas are differentiated based on whether the data has been received for a location.

3. The system of claim 1, wherein the display device is coupled to a mobile computing device that is paired with the one or more pressure-sensitive wearable devices.

4. The system of claim 1, wherein the instructions further cause the processor to aggregate data from wearable devices of multiple people.

5. The system of claim 1, wherein the surface property measurement corresponds to surface hardness.

6. The system of claim 1, wherein the surface property measurement corresponds to at least one of linear or rotational traction.

7. The system of claim 1, wherein the surface property measurement corresponds to one of infill stability, vertical deformation, or shock absorption.

8. The system of claim 1, wherein at least one of the one or more pressure-sensitive wearable devices is a shoe insole.

9. The system of claim 1, wherein at least one of the one or more pressure-sensitive wearable devices is a shoe cleat.

10. The system of claim 1, wherein at least one of the one or more pressure-sensitive wearable devices is a sock.

11. The system of claim 1, wherein the visual representation is conveyed to an augmented reality device that overlays the visual representation on a surface in view.

12. A method, comprising:
   executing, on a processor, instructions that cause the processor to perform operations associated with surface analysis, the operations comprising:
      determining a location on a surface associated with data received from one or more wearable pressure sensors that measure pressure exerted by the surface;
      computing a surface property metric based on the data and the location;
      generating a graphic representation of the surface property metric; and
      conveying the graphic representation to a display device for presentation.

13. The method of claim 12, wherein the operations further comprising:
   determining a location on the surface associated with the data; and
   identifying the location as visited on the graphic representation.

14. The method of claim 12, further comprising generating a heat map with surface property metrics as the graphic representation, wherein the heat map is overlaid on an image representative of the surface.

15. The method of claim 12, further comprising giving instructions for performing movements in order to record a surface property metric.

16. The method of claim 12, further comprising providing real-time feedback on movements being performed for measuring surface performance and properties.

17. The method of claim 12, further comprising conveying the graphic representation to an augmented reality device for display.

18. A method, comprising:
   pairing a computing device to one or more wearable pressure sensors;
   receiving data from the sensors;
   determining a location on a surface associated with the data from the sensors;
   computing a surface property from the data;
   generating a graphical representation of the surface property at the location on the surface; and
   convey the graphical representation to a display device for rendering.

19. The method of claim 18, further comprising determining a maintenance recommendation based on the surface property.

20. The method of claim 18, further comprising providing instructions for performing movements in order to record the surface entirely.

* * * * *